United States Patent
Suginishi et al.

(10) Patent No.: US 8,442,666 B2
(45) Date of Patent: May 14, 2013

(54) DYNAMIC MAINTENANCE PLANNING APPARATUS

(75) Inventors: Yuuichi Suginishi, Fujisawa (JP); Lengyel Attila, San Jose, CA (US); Yoichi Nonaka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 337 days.

(21) Appl. No.: 12/792,145

(22) Filed: Jun. 2, 2010

(65) Prior Publication Data

US 2010/0312371 A1 Dec. 9, 2010

(30) Foreign Application Priority Data

Jun. 3, 2009 (JP) ................................. 2009-134174

(51) Int. Cl.
*G06F 19/00* (2006.01)
(52) U.S. Cl.
USPC .......................................................... 700/101
(58) Field of Classification Search ................ 700/7, 14, 700/19, 101, 102
See application file for complete search history.

(56) References Cited

FOREIGN PATENT DOCUMENTS

| JP | 409277141 A | * | 10/1997 |
|---|---|---|---|
| JP | 9-285948 | | 11/1997 |
| JP | 2004-295679 | | 10/2004 |

OTHER PUBLICATIONS

Marquez et al. "Improving prevnetive mainteance scahduling in semiconductor fabrication facilaties"; Oct. 2006; Production Planning & Control; vol. 17, No. 7 pp. 742-754.*
Rose, O; "WIP Evolution of a Semiconductor Factory After a Bottleneck Workcneter Breakdown"; May 1998; University of Wurzburg Institute of Computer science Research Report Series; Report No. 203pp. 1-15.*
JP Office Action for Japanese Application No. 2009-134174, issued on Jan. 29, 2013.

* cited by examiner

*Primary Examiner* — Jeffrey A Gaffin
*Assistant Examiner* — Chad Rapp
(74) *Attorney, Agent, or Firm* — Antonelli, Terry, Stout & Kraus, LLP.

(57) ABSTRACT

A dynamic maintenance planning apparatus including a maintenance planning device and a priority calculating device is provided. The maintenance planning device determines a maintenance date and time on and at which the throughput of a manufacturing system is maximum from among possible maintenance dates and times based on a simulation result in which a specific manufacturing apparatus on a manufacturing system is stopped at a specified maintenance date and time, and, for the maintenance at the determined maintenance date and time, specifies a lot whose completion is predicted to be delayed. The priority calculating device calculates a priority of the lot whose completion is predicted to be delayed so as to prevent waiting time of the lot during the maintenance.

5 Claims, 18 Drawing Sheets

FIG. 3

| PROCESS No. | PROCESS NAME | NAME OF USED APPARATUS 1 AND PROCESS TIME | NAME OF USED APPARATUS 2 AND PROCESS TIME | NAME OF USED APPARATUS 3 AND PROCESS TIME | ... |
|---|---|---|---|---|---|
| 001 | ... | ... | ... | ... | ... |
|  | ... | ... | ... | ... | ... |
| 005 | FIRST PROCESS 1-1 | P APPARATUS 1 30 min. | P APPARATUS 2 25 min. | P APPARATUS 3 30 min. | ... |
| 006 | FIRST PROCESS 1-2 | S APPARATUS 3 15 min. |  |  |  |
| 007 | FIRST PROCESS 1-3 | D APPARATUS 1 15 min. | D APPARATUS 3 10 min. | D APPARATUS 5 15 min. | ... |
| 008 | FIRST PROCESS 1-4 | E APPARATUS 2 30 min. | E APPARATUS 4 25 min. | E APPARATUS 6 25 min. |  |
| 009 | FIRST PROCESS 1-5 | A APPARATUS 1 30 min. | A APPARATUS 5 30 min. |  |  |
|  | ... | ... | ... | ... | ... |
| 125 | FIFTH PROCESS 5-1 | P APPARATUS 4 30 min. | P APPARATUS 5 25 min. | P APPARATUS 6 30 min. | ... |
| 126 | FIFTH PROCESS 5-2 | S APPARATUS 2 15 min. |  |  |  |
| 127 | FIFTH PROCESS 5-3 | D APPARATUS 2 15 min. | D APPARATUS 4 10 min. | D APPARATUS 6 15 min. | ... |
| 128 | FIFTH PROCESS 5-4 | M APPARATUS 1 90 min. |  |  |  |
| 129 | FIFTH PROCESS 5-5 | C APPARATUS 7 45 min. |  |  |  |
| 130 | FIFTH PROCESS 5-6 | A APPARATUS 1 30 min. | A APPARATUS 2 30 min. |  |  |
|  |  |  |  |  |  |

FIG. 4

| 113b | 113c | 113d | 113e | 113a ▾ 113g | 113f 113h | |
| --- | --- | --- | --- | --- | --- | --- |
| MAINTENANCE No. | APPARATUS NAME | NUMBER OF PROCESS-STOPPING PROCESSES | MAINTENANCE PERIOD [days] | MAINTENANCE START TIME PLAN 1 | MAINTENANCE START TIME PLAN 2 | ... |
| 01 | P APPARATUS 2 | 0 | 0.5 | 2009.3.1 10:00 | 2009.3.2 10:00 | |
| 02 | M APPARATUS 2 | 2 | 3 | 2009.3.1 10:00 | 2009.3.2 10:00 | ... |
| ... | ... | ... | ... | ... | | |
| 21 | E APPARATUS 1 | 5 | 3.5 | 2009.3.12 9:00 | 2009.3.13 9:00 | ... |
| 22 | C APPARATUS 7 | 5 | 3.5 | 2009.3.13 9:00 | | |
| 23 | S APPARATUS 3 | 15 | 1 | 2009.3.13 9:00 | | |
| 24 | F APPARATUS 2 | 30 | 2 | 2009.3.14 9:00 | 2009.3.21 9:00 | ... |
| | ... | ... | ... | ... | ... | |

FIG. 5

| LOT ID | TYPE NAME | SHIPMENT REQUEST DATE | QUANTITY | RELEASE DATE |
|---|---|---|---|---|
| A01 | PROTOTYPE A | 2009.4.1 | 4 | 2009.3.2 |
| B02 | PROTOTYPE B | 2009.4.5 | 8 | 2009.3.2 |
| CE03 | PRODUCT A | 2009.5.8 | 8 | 2009.3.3 |
| CH04 | PRODUCT A | 2009.5.10 | 8 | 2009.3.4 |
| CJ05 | PRODUCT B | 2009.5.15 | 8 | 2009.3.5 |
| ... | ... | ... | ... | ... |

FIG. 6

| LOT ID | TYPE NAME | SHIPMENT REQUEST DATE | QUANTITY | PROCESS No. | STATUS |
|---|---|---|---|---|---|
| A01 | PROTOTYPE A | 2009.4.1 | 4 | 100 | WAIT FOR CONSTRUCTION START |
| B02 | PROTOTYPE B | 2009.4.5 | 8 | 231 | UNDER CONSTRUCTION (10 min. ELAPSED) M APPARATUS 2 |
| CE03 | PRODUCT A | 2009.5.8 | 8 | 92 | UNDER CONSTRUCTION (30 min. ELAPSED) S APPARATUS 1 |
| CH04 | PRODUCT A | 2009.5.10 | 8 | 43 | SHIPPING |
| CJ05 | PRODUCT B | 2009.5.15 | 8 | 31 | CONSTRUCTION STOP |
| ... | ... | ... | ... | ... | ... |

FIG. 7

| APPARATUS No. | APPARATUS NAME | STATUS |
|---|---|---|
| 01 | S APPARATUS 1 | UNDER CONSTRUCTION |
| 02 | C APPARATUS 3 | UNDER MAINTENANCE |
| 03 | M APPARATUS 1 | LOT WAIT TIME |
| 04 | E APPARATUS 1 | NOT IN WORK |
| 05 | P APPARATUS 3 | DETERMINE CONDITIONS |
| . . . | . . . | . . . |

FIG. 8

| MAINTENANCE No. | APPARATUS NAME | MAINTENANCE START TIME | MAINTENANCE PERIOD [days] |
|---|---|---|---|
| 01 | P APPARATUS 2 | 2009.3.12 9:00 | 0.5 |
| 02 | M APPARATUS 2 | 2009.3.13 9:00 | 3 |
|  | . . . |  |  |
| 21 | E APPARATUS 1 | 2009.3.12 9:00 | 3.5 |
| 22 | C APPARATUS 7 | 2009.3.13 9:00 | 3.5 |
| 23 | S APPARATUS 3 | 2009.3.12 9:00 | 1 |
| 24 | F APPARATUS 2 | 2009.3.13 9:00 | 2 |
|  | . . . |  | . . . |
|  |  |  |  |

FIG. 9

| MAINTENANCE No. | APPARATUS NAME | MAINTENANCE START TIME | LOT ID | | | |
|---|---|---|---|---|---|---|
| | | | A01 | B02 | CE03 | CH04 |
| 01 | P APPARATUS 2 | 2009.3.9 10:00 | 0 | 0 | 1 | 1 |
| 02 | M APPARATUS 2 | 2009.3.10 10:00 | 0 | 1 | 1 | 0 |
| ⋮ | ⋮ | ⋮ | ⋮ | ⋮ | ⋮ | ⋮ |
| 21 | E APPARATUS 1 | 2009.3.11 9:00 | 1 | 0 | 0 | 0 |
| 22 | C APPARATUS 7 | 2009.3.12 9:00 | 0 | 0 | 1 | 0 |
| 23 | S APPARATUS 3 | 2009.3.13 9:00 | 0 | 0 | 0 | 0 |
| ⋮ | ⋮ | ⋮ | ⋮ | ⋮ | ⋮ | ⋮ |

FIG. 12

| LOT ID | TYPE NAME | QUANTITY | TIME FOR PRIORITY CALCULATION | PROCESS No. | REMAINED WORK TIME [days] | PRIORITY INDEX |
|---|---|---|---|---|---|---|
| A01 | PROTOTYPE A | 4 | 2009.4.1 | 100 | 7 | 1.2 |
| B02 | PROTOTYPE B | 8 | (M) 2009.3.12 | 231 | (M)5.6 | 1.0 |
| CE03 | PRODUCT A | 8 | (M) 2009.3.8 | 92 | (M)15.8 | 2 |
| CH04 | PRODUCT A | 8 | (M) 2009.4.10 | 43 | (M)20 | 1.8 |
| CJ05 | PRODUCT B | 8 | 2009.5.15 | 31 | 22.5 | 1.3 |
| ⋮ | ⋮ | ⋮ | ⋮ | ⋮ | ⋮ | ⋮ |

FIG. 13

| APPARATUS NAME: S APPARATUS 3 | | ←137a |
|---|---|---|
| PRIORITY | LOT ID | |
| 1 | A01 | |
| 2 | B02 | |
| 3 (M) | CE03 | |
| | CH04 | |
| ⋮ | ⋮ | |

137b     137c

DYNAMIC MAINTENANCE PLANNING APPARATUS

CROSS-REFERENCE TO RELATED APPLICATION

The present application claims priority from Japanese Patent Application No. 2009-134174 filed on Jun. 3, 2009, the content of which is hereby incorporated by reference into this application.

TECHNICAL FIELD OF THE INVENTION

Regarding electronic device products such as semiconductor elements, magnetic storage devices, flat panel displays, and printed boards; industrial machine products such as automobiles, elevators (or lifts), escalators, and construction machines; and products successively processed such as petroleum refining, pharmaceutical production, and food processing, the present invention relates to dynamic maintenance planning apparatuses in a system for calculating a priority of a lot to be released in each manufacturing process in order to enhance production efficiency of a production system configured of a plurality of processes. In particular, the present invention relates to a technology of minimizing a decrease of the throughput of a manufacturing system caused by maintenance.

BACKGROUND OF THE INVENTION

In a manufacturing process, priorities of lots to be released into a manufacturing apparatus are determined according to a predetermined rule. Examples of a priority determination rule using a remaining time until a scheduled shipping time (delivery time) and a scheduled remaining operation time until completion include (a) the lots are processed in order of increasing critical ratio (CR: a remaining time until the delivery time divided by a scheduled remaining operation time until completion) value and (b) the lots are processed in order of increasing slack (allowance) value (=time until the delivery time−scheduled remaining operation time until completion) (for example, refer to Japanese Patent Application Laid-Open Publication No. 2004-295679 (Patent Document 1)).

SUMMARY OF THE INVENTION

In calculation of the critical ratio (CR) value and the slack value, a sum of average operation times in the remaining processes for the respective lots is used as the scheduled remaining operation time until completion. Here, when it takes more than an average operation time due to, for example, a process wait caused by long-duration maintenance of the manufacturing apparatus, the time of completion disadvantageously becomes unstable, and also the throughput of a manufacturing system is decreased.

Therefore, an object of the present invention is to provide a dynamic maintenance planning apparatus capable of calculating a maintenance start date for minimizing lots whose completion will be delayed due to a waiting time caused by maintenance of the manufacturing apparatus and calculating a priority of each lot to minimize a decrease of the throughput of a manufacturing system caused by maintenance of the manufacturing apparatus.

The above and other preferred aims and novel characteristics of the present invention will be apparent from the description of the present specification and the accompanying drawings.

The typical ones of the inventions disclosed in the present application will be briefly described as follows.

That is, in brief, an apparatus of a typical invention includes: a maintenance plan generating unit that determines a maintenance date and time when a throughput of a manufacturing system is maximum from among possible maintenance dates and times based on a result of a simulation in which a specific manufacturing apparatus on a manufacturing system is stopped at a specified date and time; a completion-delayed-lot calculating unit that specifies a lot whose completion is predicted to be delayed due to maintenance on the determined maintenance time and date; and a priority calculating unit that calculates a priority of the lot whose completion is predicted to be delayed so as to prevent waiting time of the lot during maintenance.

The effects obtained by typical aspects of the present invention will be briefly described below.

That is, an effect that can be obtained by the typical invention as described above is such that a maintenance start date that allows the number of lots in waiting time during a maintenance period of the manufacturing apparatus to be minimized, and priorities of the lots are simultaneously calculated, thereby maximizing the throughput of the manufacturing system.

BRIEF DESCRIPTIONS OF THE DRAWINGS

FIG. 3 is a schematic diagram of a type-specific process routing table of the dynamic maintenance planning apparatus according to the embodiment of the present invention;

FIG. 4 is a schematic diagram of an apparatus maintenance plan table of the dynamic maintenance planning apparatus according to the embodiment of the present invention;

FIG. 5 is a schematic diagram of a lot releasing plan table of the dynamic maintenance planning apparatus according to the embodiment of the present invention;

FIG. 6 is a schematic diagram of a lot state table of the dynamic maintenance planning apparatus according to the embodiment of the present invention;

FIG. 7 is a schematic diagram of a manufacturing-apparatus state table of the dynamic maintenance planning apparatus according to the embodiment of the present invention;

FIG. 8 is a schematic diagram of an apparatus maintenance plan result table of the dynamic maintenance planning apparatus according to the embodiment of the present invention;

FIG. 9 is a schematic diagram of a delayed lot table of the dynamic maintenance planning apparatus according to the embodiment of the present invention;

FIG. 12 is a schematic diagram of a priority information table of the dynamic maintenance planning apparatus according to the embodiment of the present invention;

FIG. 13 is a schematic diagram of an apparatus-specific priority information table of the dynamic maintenance planning apparatus according to the embodiment of the present invention;

Figure 18:
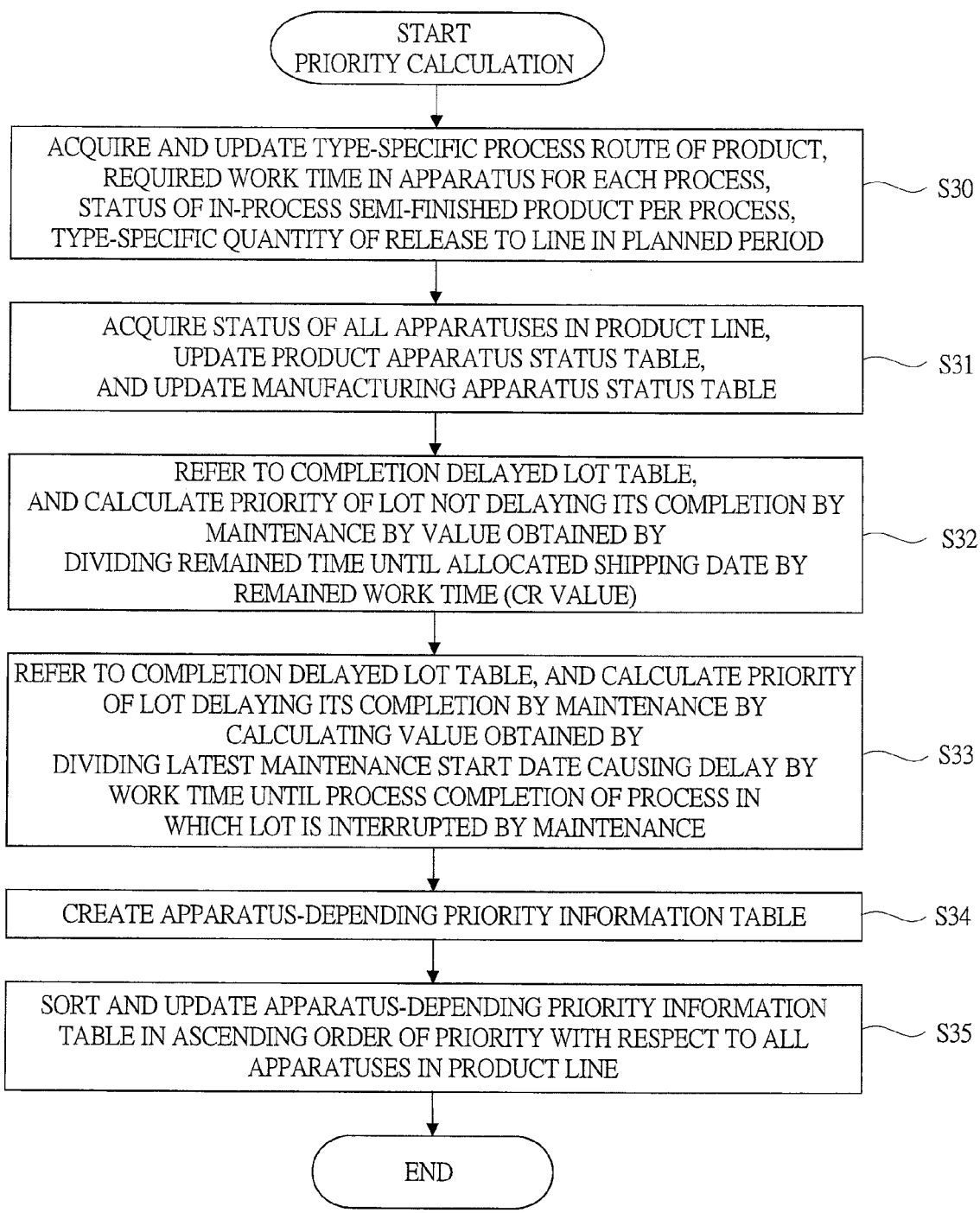
Figure 19:
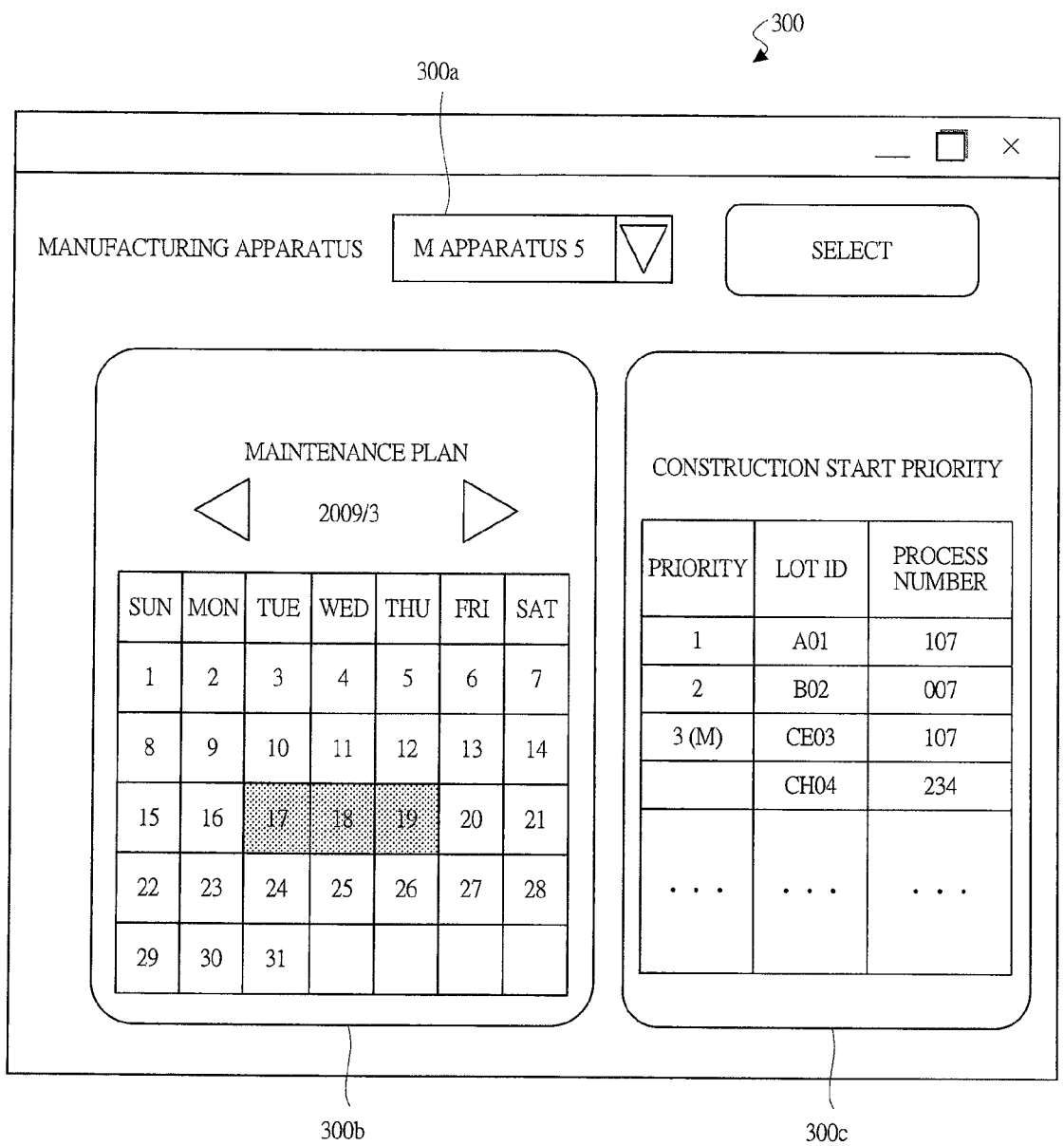

FIG. 18 is a flowchart of a process performed by the priority calculating device of the dynamic maintenance planning apparatus according to the embodiment of the present invention; and FIG. 19 is a schematic diagram of an output screen as an example of output information generated by the priority calculating device of the dynamic maintenance planning apparatus according to the embodiment of the present invention.

DESCRIPTIONS OF THE PREFERRED EMBODIMENTS

Embodiments of the present invention will be described below with reference to the accompanying drawings.

First, a structure of a dynamic maintenance planning apparatus according to an embodiment of the present invention is described.

Figure 1:
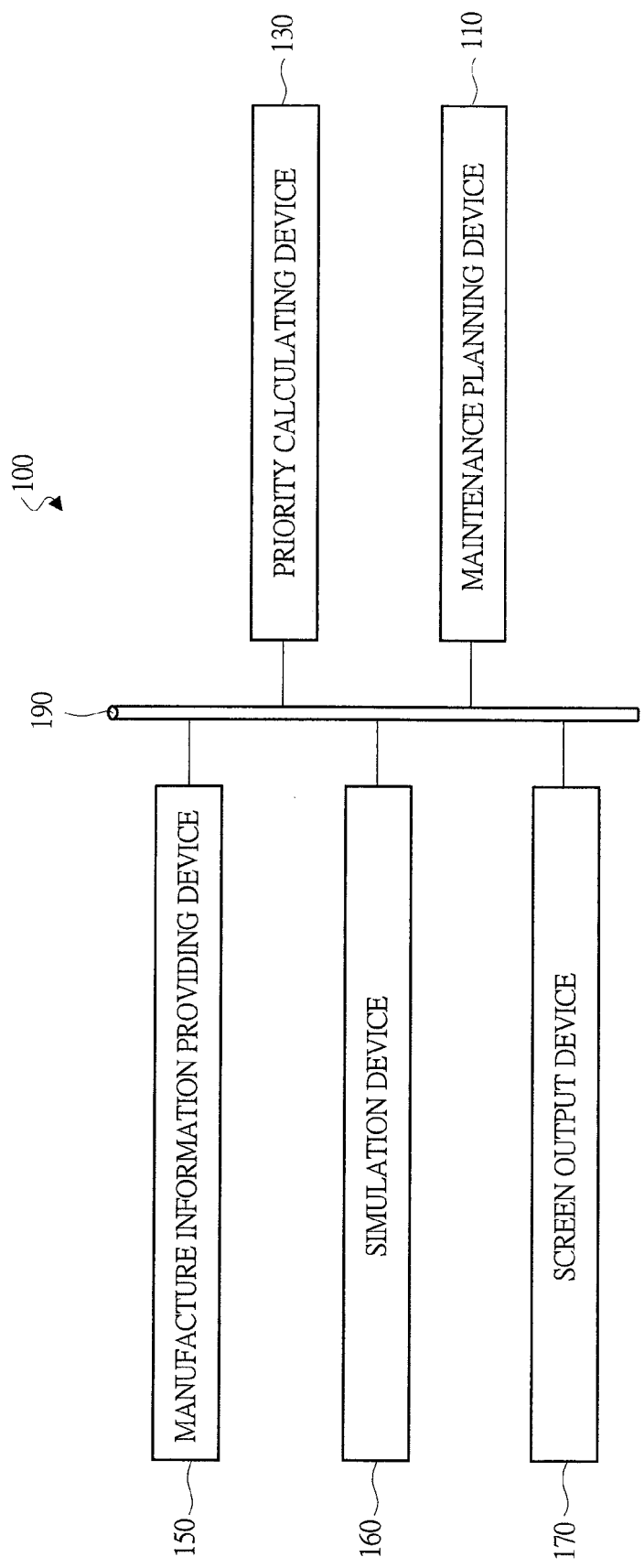
FIG. 1 is a configuration diagram of a structure of a dynamic maintenance planning apparatus according to an embodiment of the present invention.

FIG. 1 is a configuration diagram of the structure of the dynamic maintenance planning apparatus according to the embodiment of the present invention.

In FIG. 1, a dynamic maintenance planning apparatus 100 includes a maintenance planning device 110, a priority calculating device 130, a manufacturing-information providing device 150, a simulation device 160, and a screen output device 170. These devices can mutually transmit and receive information via a network 190.

Figure 2:
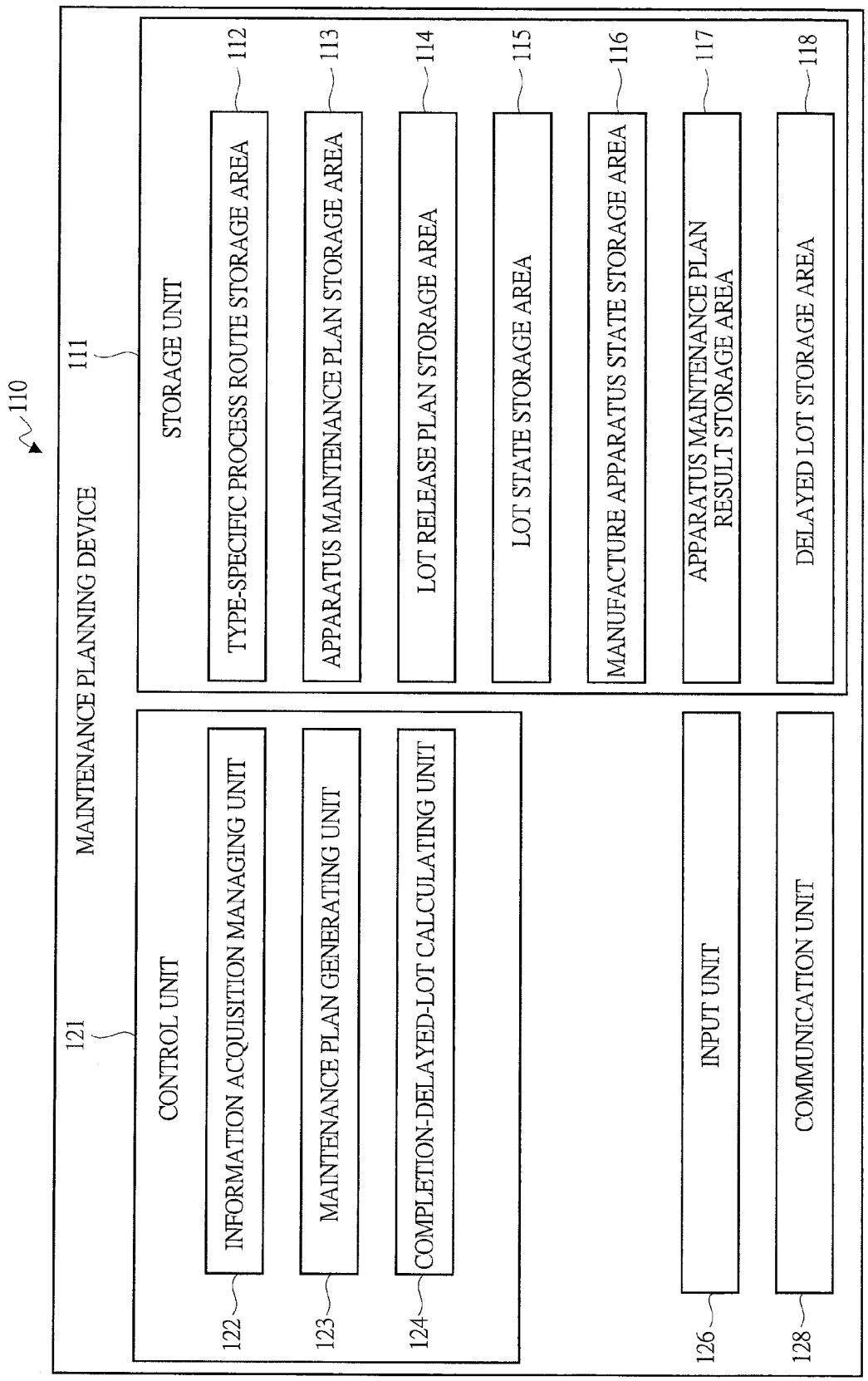
FIG. 2 is a configuration diagram of a structure of a maintenance planning device of the dynamic maintenance planning apparatus according to the embodiment of the present invention.

FIG. 2 is a configuration diagram of a structure of the maintenance planning device of the dynamic maintenance planning apparatus according to the embodiment of the present invention.

In FIG. 2, the maintenance planning device 110 includes a storage unit 111, a control unit 121, an input unit 126, and a communication unit 128.

The storage unit 111 includes a type-specific process route storage area 112, an apparatus-maintenance-plan storage area 113, a lot-release-plan storage area 114, a lot-state storage area 115, a manufacturing-apparatus state storage area 116, an apparatus-maintenance-plan-result storage area 117, and a delayed-lot storage area 118.

In the type-specific process route storage area 112, for each type of product, information specifying a manufacturing process and an apparatus available for use in that manufacturing process is stored. For example, in the present embodiment, for each type of product, a type-specific process routing table 112a as depicted in FIG. 3 (which is a schematic diagram of the type-specific process routing table 112a) is stored in the type-specific process route storage area 112.

The type-specific process routing table 112a has a process No. column 112b, a process name column 112c, and a manufacturing-apparatus column 112d.

In the process No. column 112b, information specifying a process number is stored, which is identification information capable of uniquely identifying a manufacturing process of a product.

In the process name column 112c, information specifying a process name for identifying the process identified in the process No. column 112b is stored.

In the manufacturing-apparatus column 112d, information specifying a name of the manufacturing apparatus available for use in the process specified by the process No. column 112b and the process name column 112c and a process time required for the process is stored.

For example, in the present embodiment, in the manufacturing-apparatus column 112d, names and process times of all apparatuses available for use in the process specified in the process No. column 112b and the process name column 112c are listed, such as a name and process time of a used apparatus 1 column 112e, a name and process time of a used apparatus 2 column 112f, a name and process time of a used apparatus 3 column 112g . . . .

Also, in the apparatus-maintenance-plan storage area 113, for each scheduled manufacturing-apparatus maintenance, information specifying the name of the manufacturing apparatus as a target for the maintenance, the number of processes that will stop due to the maintenance of the apparatus, a period required for the scheduled maintenance, and a plan of maintenance start time is stored. For example, in the present embodiment, an apparatus maintenance plan table 113a as depicted in FIG. 4 (which is a schematic diagram of the apparatus maintenance plan table 113a) is stored in the apparatus maintenance plan storage area 113.

The apparatus maintenance plan table 113a includes a maintenance No. column 113b, an apparatus name column 113c, a number of stopping processes column 113d, and a maintenance period column 113e, and a maintenance start time plan column 113f.

In the maintenance No. column 113b, information specifying a maintenance number is stored, which is identification information capable of uniquely identifying each maintenance.

In the apparatus name column 113c, information specifying the name of a manufacturing apparatus as a target for the maintenance identified in the maintenance No. column 113b is stored.

In the number of stopping processes column 113d, the number of processes is stored that will stop when the manufacturing apparatus specified in the maintenance No. column 113b and the apparatus name column 113c stops.

In the maintenance period column 113e, information specifying a scheduled maintenance period of the manufacturing apparatus specified in the maintenance No. column 113b and the apparatus name column 113c is stored.

In the maintenance start time plan column 113f, information specifying a plan of a maintenance start time for the manufacturing apparatus specified in the maintenance No. column 113b and the apparatus name column 113c is stored. For example, in the present embodiment, in the maintenance start time plan column 113f, pieces of information specifying a proposal of month, date, and time for maintenance are listed, such as a maintenance start time plan 1 column 113g, a maintenance start time plan 2 column 113h, . . . .

Also, in the lot release plan storage area 114, a lot ID, type name, shipping request date, quantity, and scheduled releasing date of a lot scheduled to be released are stored. For example, in the present embodiment, a lot releasing plan table 114a as depicted in FIG. 5 (which is a schematic diagram of the lot releasing plan table 114a) is stored in the lot release plan storage area 114.

The lot release plan table 114a includes a lot ID column 114b, a type name column 114c, a shipping request date column 114d, a quantity column 114e, and a release date column 114f.

In the lot ID column 114b, information identifying a lot ID is stored, which is identification information capable of uniquely identifying each lot.

In the type name column 114c, information specifying a type name of the lot specified in the lot ID column 114b is stored.

In the shipping request date column 114d, information specifying a shipping request year, month, and day of the lot specified in the lot ID column 114b is stored.

In the quantity column 114e, information specifying the quantity of products included in the lot specified in the lot ID column 114b is stored.

In the release date column 114f, information specifying a releasing year, month, and day of the lot specified in the lot ID column 114b in manufacturing process is stored.

Also, the lot-state storage area 115 includes, for each lot on a manufacturing system, information specifying a shipping request date, quantity of products included, process number of an ongoing process, and lot state. For example, in the present embodiment, a lot state table 115a as depicted in FIG. 6 (which is a schematic diagram of the lot state table 115a) is stored in the lot-state storage area 115.

The lot state table 115a includes a lot ID column 115b, a type name column 115c, a shipping request date column 115d, a quantity column 115e, a process No. column 115f, and a state column 115g.

In the lot ID column 115b, information specifying a lot ID is stored, which is identification information capable of uniquely identifying each lot.

In the type name column 115c, information specifying the name of the type of the lot specified in the lot ID column 115b is stored.

In the shipping request date column 115d, information specifying a shipping request year, month, and day of the lot specified in the lot ID column 115b is stored.

In the quantity column 115e, information specifying the quantity of products included in the lot specified in the lot ID column 115b is stored.

In the process No. column 115f, information specifying an ongoing process for the lot specified in the lot ID column 115b is stored.

In the state column 115g, information specifying the state of the ongoing process for the lot specified in the lot ID column 115b is stored.

Furthermore, the manufacturing-apparatus state storage area 116 includes information specifying a state of each manufacturing apparatus configuring the manufacturing system. For example, in the present embodiment, a manufacturing-apparatus state table 116a as depicted in FIG. 7 (which is a schematic diagram of the manufacturing-apparatus state table 116a) is stored in the manufacturing-apparatus state storage area 116.

The manufacturing-apparatus state table 116a includes an apparatus No. column 116b, an apparatus name column 116c, and an apparatus state column 116d.

In the apparatus No. column 116b, information specifying an apparatus number is stored, which is identification information capable of uniquely specifying each apparatus.

In the apparatus name column 116c, information specifying the name of the apparatus specified in the apparatus No. column 116b is stored.

In the apparatus state column 116d, information specifying the state of the apparatus specified in the apparatus No. column 116b is stored.

Still further, the apparatus maintenance plan result storage area 117 includes an output result from a maintenance plan generating unit 123, which will be described further below, for each scheduled manufacturing-apparatus maintenance. For example, in the present embodiment, an apparatus maintenance plan result table 117a as depicted in FIG. 8 (which is a schematic diagram of the apparatus maintenance plan result table 117a) is stored in the apparatus-maintenance-plan-result storage area 117.

The apparatus maintenance plan result table 117a includes a maintenance No. column 117b, an apparatus name column 117c, a maintenance start time column 117d, and a maintenance period column 117e.

In the maintenance No. column 117b, information specifying a maintenance number is stored, which is identification information capable of uniquely identifying each maintenance.

In the apparatus name column 117c, information specifying the name of a manufacturing apparatus as a target for the maintenance specified in the maintenance No. column 117b is stored.

In the maintenance start time column 117d, information is stored specifying a maintenance start time when the throughput of a manufacturing system calculated by the maintenance plan generating unit 123, which will be described further below, is maximum among maintenance start times for the manufacturing apparatus specified in the maintenance No. column 117b and the apparatus name column 117c.

In the maintenance period column 117e, information specifying a maintenance period scheduled for the manufacturing apparatus specified in the maintenance No. column 117b and the apparatus name column 117c is stored.

Still further, the delayed-lot storage area 118 includes an output result from a completion-delayed-lot calculating unit 124, which will be described further below, for each scheduled manufacturing-apparatus maintenance. For example, in the present embodiment, a delayed lot table 118a as depicted in FIG. 9 (which is a schematic diagram of the delayed lot table 118a) is stored in the delayed-lot storage area 118.

The delayed lot table 118a has a maintenance No. column 118b, an apparatus name column 118c, a maintenance start time column 118d, and a logical value column 118e for specifying a lot whose completion will be delayed due to the maintenance output from the completion-delayed-lot calculating unit 124, which will be described further below.

In the maintenance No. column 118b, information specifying a maintenance number is stored, which is identification information capable of uniquely identifying each maintenance.

In the apparatus name column 118c, information specifying the name of a manufacturing apparatus as a target for the maintenance identified in the maintenance No. column 118b is stored.

In the maintenance start time column 118d, information is stored specifying a maintenance start time when the throughput of a manufacturing system calculated by the maintenance plan generating unit 123, which will be described further below, is maximum among maintenance start times for the manufacturing apparatus specified in the maintenance No. column 118b and the apparatus name column 118c.

In the logical value column 118*e*, information for all lots is stored, which is to specify a lot whose completion is predicted by the completion-delayed-lot calculating unit 124 to be delayed when maintenance of the manufacturing apparatus specified in the maintenance No. column 118*b* and the apparatus name column 118*c* is performed.

In a logical value column 118*f*, an output result from the completion-delayed-lot calculating unit 124 for a lot with a lot ID A01 is stored. In a logical value column 118*g*, an output result from the completion-delayed-lot calculating unit 124 for a lot with a lot ID B02 is stored. In a logical value column 118*h*, an output result from the completion-delayed-lot calculating unit 124 for a lot with a lot ID CE03 is stored. In a logical value column 118*i*, an output result from the completion-delayed-lot calculating unit 124 for a lot with a lot ID CH04 is stored.

Here, when a value for a lot in a certain logical value column in the table with respect to a certain maintenance indicates '1', completion of that lot will be delayed due to that maintenance. When a value for a lot in a certain logical value column on the table with respect to a certain maintenance indicates '0', completion of that lot will not be delayed due to that maintenance.

Still further, the control unit 121 includes an information acquisition managing unit 122, the maintenance plan generating unit 123, and the completion-delayed-lot calculating unit 124.

The information acquisition managing unit 122 acquires, from the manufacturing-information providing device 150, information stored in the type-specific process routing table 112*a*, the apparatus maintenance plan table 113*a*, and the lot releasing plan table 114*a* at a predetermined time (for example, at intervals of one week), and updates these tables.

Here, when a process of manufacturing a product is changed, the information acquisition managing unit 122 acquires at least information specifying the changed process from the manufacturing-information providing device 150, and updates the type-specific process routing table 112*a*.

Furthermore, the information acquisition managing unit 122 acquires, at a predetermined time (for example, at intervals of one week) from the manufacturing-information providing device 150, information stored in the shipping request date column 115*d* of the lot state table 115*a*, and updates the lot state table 115*a*.

For example, upon acquiring information from the manufacturing-information providing device 150, the information acquisition managing unit 122 discards information stored in the shipping request date column 115*d* in the lot state table 115*a*, and stores the information acquired from the manufacturing-information providing device 150, thereby updating the lot state table 115*a*.

Still further, the information acquisition managing unit 122 acquires, at a predetermined time (for example, at intervals of 300 seconds) from the manufacturing-information providing device 150, information stored in the manufacturing-apparatus state table 116*a*, and updates the table.

The maintenance plan generating unit 123 inputs the type-specific process routing table 112*a*, the apparatus maintenance plan table 113*a*, the lot releasing plan table 114*a*, the lot state table 115*a*, and the manufacturing-apparatus state table 116*a* into the simulation device 160, which will be described further below. Then, for each maintenance in the apparatus maintenance plan table 113*a* and for each maintenance start time proposal column 113*f* for the target maintenance, the maintenance plan generating unit 123 calculates, regarding maintenances in which maintenance start times are not determined except for the target maintenance, the throughput of a manufacturing system during a specific plan period (for example, one month) and a lot which will be completed after the scheduled shipping date to cause a delivery delay when using values stored in the maintenance time proposal 1 column 113*g*.

Figure 10:
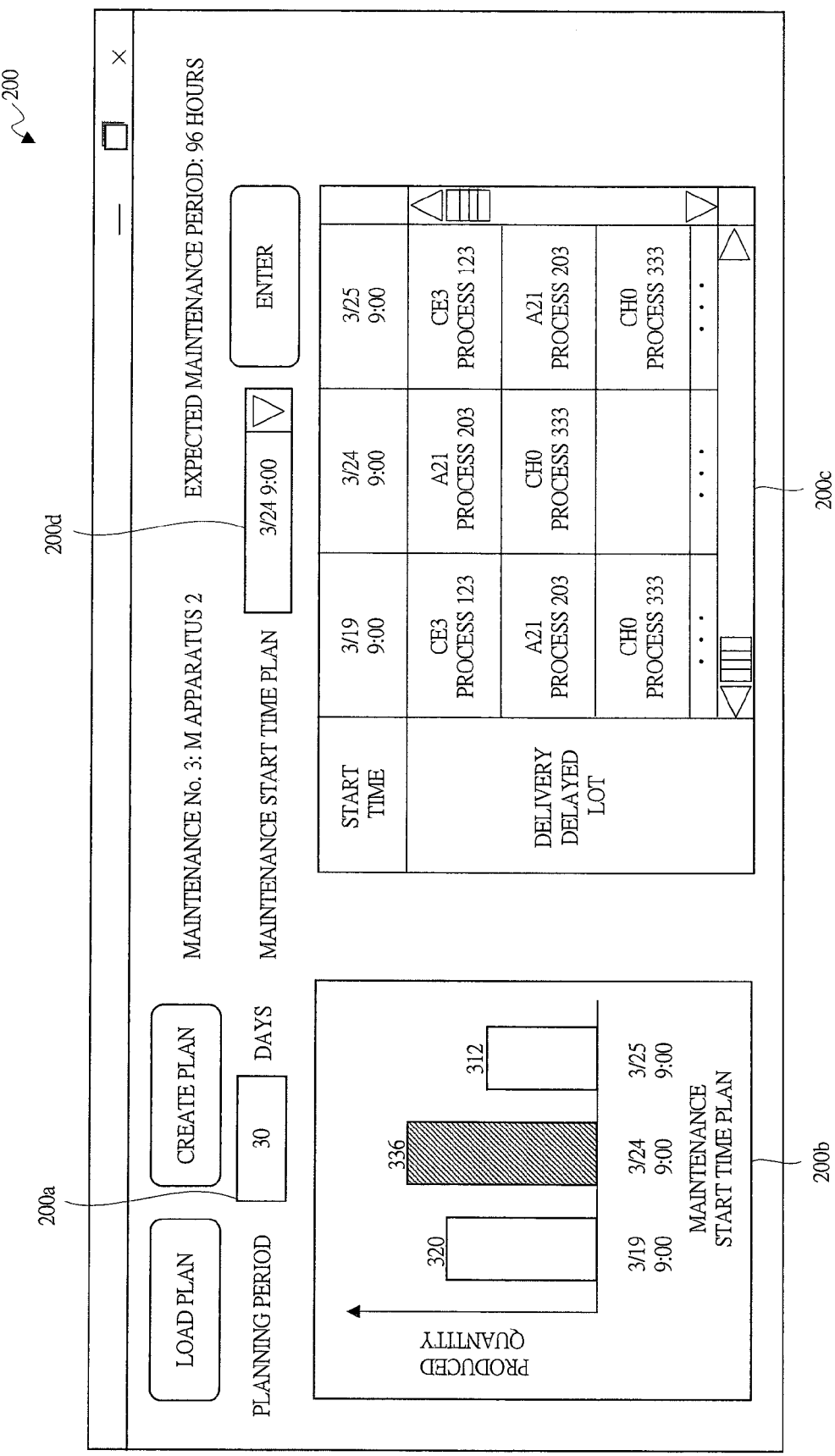
FIG. 10 is a schematic diagram of an output screen as an example of output information generated by the maintenance planning device of the dynamic maintenance planning apparatus according to the embodiment of the present invention.

The maintenance plan generating unit 123 causes a user to select a start time of the target maintenance via an output screen 200 as depicted in FIG. 10 (which is a schematic diagram of the output screen), which will be described in detail further below, and stores the selection result in the maintenance start time column 117*d* of the apparatus maintenance plan result table 117*a*. This process is performed on all apparatuses.

The completion-delayed-lot calculating unit 124 inputs the type-specific process routing table 112*a*, the lot releasing plan table 114*a*, the lot state table 115*a*, the manufacturing-apparatus state table 116*a*, the apparatus maintenance plan result table 117*a* into the simulation device 160, which will be described further below, and generates a progress plan for all lots in a specific plan period (for example, one month).

Furthermore, for every maintenance in the apparatus maintenance plan result table 117*a*, the completion-delayed-lot calculating unit 124 generates a progress plan for all lots in the case where the maintenance is not performed. For every lot, comparison is performed with the case where the maintenance is not performed, and a lot whose completion is delayed one day or more is specified.

Then, the completion-delayed-lot calculating unit 124 stores information for specifying, for each maintenance, a lot whose completion is delayed into the logical value column 118*e* of the delayed lot table 118*a*.

The input unit 126 receives an input of information.

The communication unit 128 transmits and receives information via the network 190.

Figure 11:
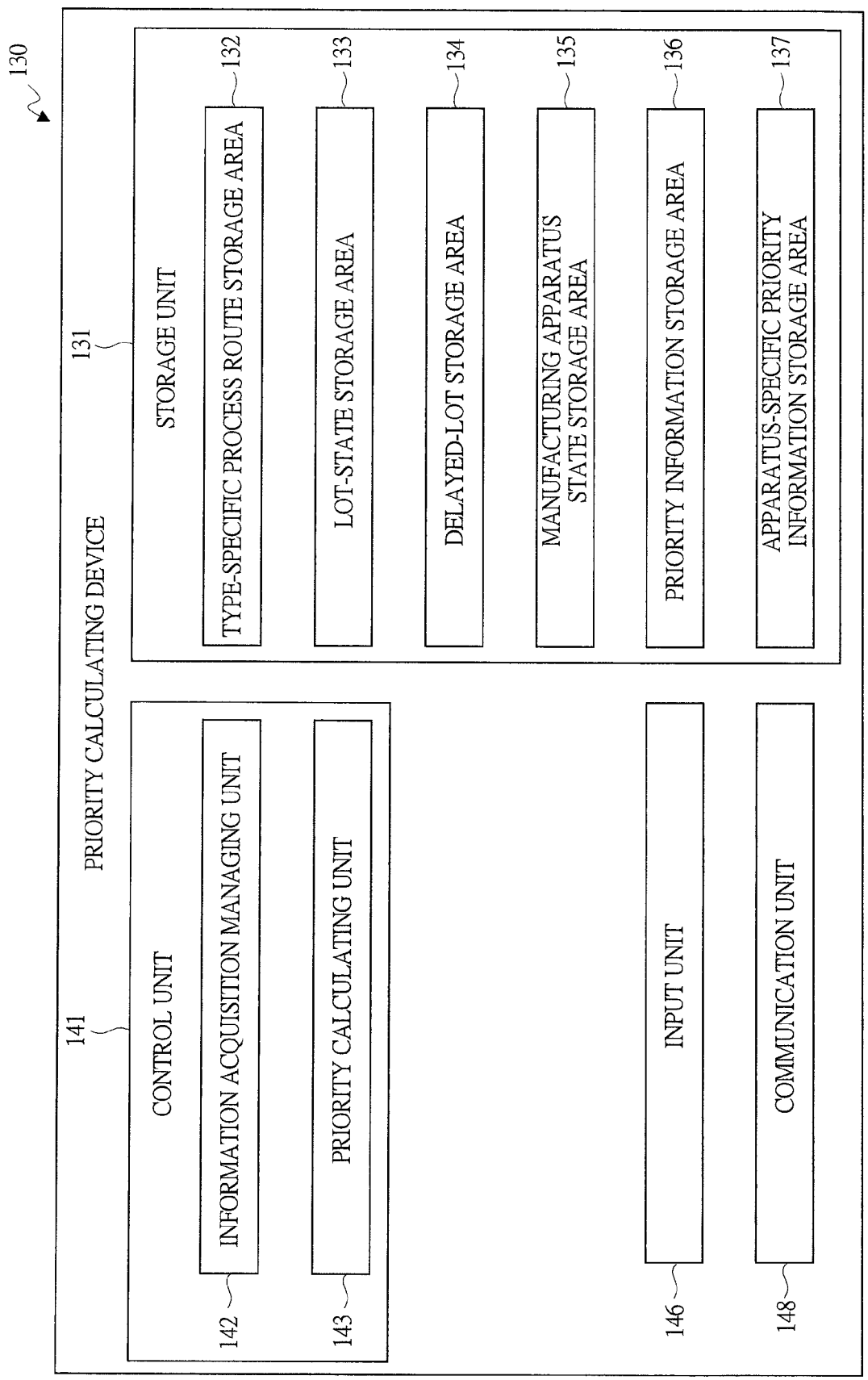
FIG. 11 is a configuration diagram of the structure of a priority calculating device of the dynamic maintenance planning apparatus according to the embodiment of the present invention.

FIG. 11 is a configuration diagram of the structure of a priority calculating device of the dynamic maintenance planning apparatus according to the embodiment of the present invention In FIG. 11, the priority calculating device 130 includes a storage unit 131, a control unit 141, an input unit 146, and a communication unit 148.

The storage unit 131 includes a type-specific process route storage area 132, a lot-state storage area 133, a delayed-lot storage area 134, a manufacturing-apparatus state storage area 135, a priority-information storage area 136, and an apparatus-specific priority-information storage area 137.

In the type-specific process route storage area 132, as with the type-specific process route storage area 112 described above, information specifying a manufacturing process and a manufacturing apparatus available for use in that manufacturing process is stored for each type of product. For example, in the present embodiment, for each type of product, the type-specific process routing table 112*a* as depicted in FIG. 3 (which is a schematic diagram of the type-specific process routing table 112*a*) is stored in the type-specific process route storage area 132.

Also, as with the lot-state storage area 115 described above, the lot-state storage area 133 includes, for each lot on a manufacturing system, information specifying a shipping request date, a quantity of included products, a process number of an ongoing process, and lot state. For example, in the present embodiment, the lot state table 115*a* as depicted in FIG. 6 (which is a schematic diagram of the lot state table 115*a*) is stored in the lot-state storage area 133.

Still further, as with the delayed-lot storage area 118, the delayed-lot storage area 134 includes an output result from the completion-delayed-lot calculating unit 124 described above for each scheduled manufacturing-apparatus maintenance. For example, in the present embodiment, the delayed lot table 118a as depicted in FIG. 9 (which is a schematic diagram of the delayed lot table 118a) is stored in the delayed-lot storage area 134.

Still further, as with the manufacturing-apparatus state storage area 116, the manufacturing-apparatus state storage area 135 includes information specifying a state for each manufacturing apparatus configuring the manufacturing system. For example, in the present embodiment, the manufacturing-apparatus state table 116a as depicted in FIG. 7 (which is a schematic diagram of the manufacturing-apparatus state table 116a) is stored in the manufacturing-apparatus state storage area 135.

The priority-information storage area 136 includes, for each lot on the manufacturing system, a quantity of included products, a time for use in calculating priority, a process number of the ongoing process, a remaining operation time for use in calculating priority, and a priority index. For example, in the present embodiment, a priority information table 136a as depicted in FIG. 12 (which is a schematic diagram of the priority information table 136a) is stored in the priority-information storage area 136.

The priority information table 136a includes a lot ID column 136b, a type name column 136c, a quantity column 136d, a priority calculation time column 136e, a process No. column 136f, a remaining operation time column 136g, and a priority index column 136h.

In the lot ID column 136b, information specifying a lot ID is stored, which is identification information capable of uniquely identifying each lot.

In the type name column 136c, information specifying a type name of the lot specified in the lot ID column 136b is stored.

In the quantity column 136d, information specifying the quantity of products included in the lot specified in the lot ID column 136b is stored.

In the priority calculation time column 136e, information is stored regarding a time for a priority calculating unit 143, which will be described further below, to calculate a priority of the lot specified in the lot ID column 136b. Also, for the lot specified in the lot ID column 136b, when a delay caused by maintenance is predicted by the priority calculating unit 143, which will be described further below, such information is stored.

In the process No. column 136f, information specifying an ongoing process for the lot specified in the lot ID column 136b is stored.

In the remaining operation time column 136g, information is stored regarding the remaining operation time for the priority calculating unit 143, which will be described further below, to calculate a priority of the lot specified in the lot ID column 136b. Also, for the lot specified in the lot ID column 136b, when a delay caused by maintenance is predicted by the priority calculating unit 143, which will be described further below, such information is stored.

In the priority index column 136h, a priority index value calculated by the priority calculating unit 143, which will be described further below, for the lot specified in the lot ID column 136b is stored.

The apparatus-specific priority-information storage area 137 includes a releasing priority of a release-waiting lot for each apparatus on the manufacturing system. For example, in the present embodiment, an apparatus-specific priority information table 137a as depicted in FIG. 13 (which is a schematic diagram of the apparatus-specific priority information table 137a) is stored in the apparatus-specific priority-information storage area 137.

The apparatus-specific priority information table 137a has a priority column 137b and a lot ID column 137c.

In the priority column 137b, information specifying a priority of the lot specified in the lot ID column 137c, which will be described below, is stored. Here, it is assumed in the present embodiment that priorities are represented with serial natural numbers starting from '1', the smaller the value, the higher the priority. Also, for the lot specified in the lot ID column 137c, which will be described further below, when a delay caused by maintenance is predicted by the priority calculating unit 143, which will be described further below, such information is also stored.

In the lot ID column 137c, information specifying a lot that is stocked in a buffer of the target apparatus and has the priority specified in the priority column 137b is stored. Here, in the present embodiment, a lot ID, which is identification information for uniquely specifying a lot, is stored as information uniquely specifying a lot.

Furthermore, the control unit 141 includes an information acquisition managing unit 142 and the priority calculating unit 143.

The information acquisition managing unit 142 stores the type-specific process routing table 112a from the manufacturing-information providing device 150 in the type-specific process route storage area 132 at a predetermined time (for example, at intervals of one week). Here, when the process of manufacturing a product is changed, the information acquisition managing unit 142 acquires at least information specifying the changed process from the manufacturing-information providing device 150, and updates the type-specific process routing table 112a of the type-specific process route storage area 132.

Furthermore, the information acquisition managing unit 142 acquires, at specific intervals (for example, at intervals of one week) from the manufacturing-information providing device 150, information stored in the shipping request date column 115d of the lot state table 115a of the lot-state storage area 133, and updates the lot state table 115a of the lot-state storage area 133.

Still further, the information acquisition managing unit 142 acquires, at a predetermined time (for example, at intervals of 300 seconds), information stored in the lot state table 115a of the lot-state storage area 133, and updates these tables.

Still further, the information acquisition managing unit 142 acquires, at a predetermined time (for example, at intervals of one day), the delayed lot table 118a stored in the delayed-lot storage area 118 in the storage unit of the maintenance planning device 110 described above, and duplicates the table in the delayed-lot storage area 134.

Still further, the information acquisition managing unit 142 acquires and updates, at specific intervals (for example, at intervals of 300 seconds) from the manufacturing-information providing device 150, information stored in the manufacturing-apparatus state table 116a of the manufacturing-apparatus state storage area 135.

The priority calculating unit 143 separates a lot that will be delayed due to maintenance from a lot that will not be delayed, based on the logical value column 118e of the delayed lot table 118a stored in the delayed-lot storage area. Furthermore, as for the lot whose completion will not be delayed due to maintenance, a priority index $cr_i$ defined by a ratio between the remaining period until the shipping date and the remaining period until product completion is calculated for each lot by using the following Equation 1.

$$cr_i = \frac{SD_i - t}{\sum\limits_{p}^{n} CT_p} \quad \text{Equation 1}$$

Here, 'i' represents an index that identifies a lot. $SD_i$ represents a scheduled shipping time of the lot i. $CT_p$ represents a process time of a process p. 'n' represents the number of processes from the ongoing process for the lot i at the time of calculation of the priority index $cr_i$ until a completing process. 't' represents a time for calculating the priority index $cr_i$.

As for the lots whose completion will be delayed due to maintenance, for each lot, a priority index $dcr_i$ defined by a ratio between the remaining time until the manufacturing apparatus stops, which causes a delay of completion, and the remaining period until completion of the process of which the apparatus that will stop is in charge is calculated for each lot by using the following Equation 2.

$$dcr_i = \begin{cases} \dfrac{MD_i - t}{\sum\limits_{p}^{m} CT_p} & MD_i - t \geq 0 \text{ and } \sum\limits_{p}^{m} CT_p \geq 0 \\ \dfrac{SD_i - t}{\sum\limits_{p}^{n} CT_p} & \text{others} \end{cases} \quad \text{Equation 2}$$

Here, $MD_i$ represents a start time of maintenance at which a waiting time of the lot occurs, and 'm' represents the number of processes from an ongoing process for the lot to a process at the time of waiting time.

The priority calculating unit 143 stores the priority index calculated from Equations 1 and 2 for every lot in the priority index column 136h of the priority information table 136a.

Still further, the priority calculating unit 143 arranges the ongoing lots for each apparatus in increasing order of the values in the priority index column 136h of the priority information table 136a, and stores the arranged ongoing lots in the apparatus-specific priority information table 137a.

The input unit 146 receives an input of information.

The communication unit 148 transmits and receives information via the network 190.

Figure 14:
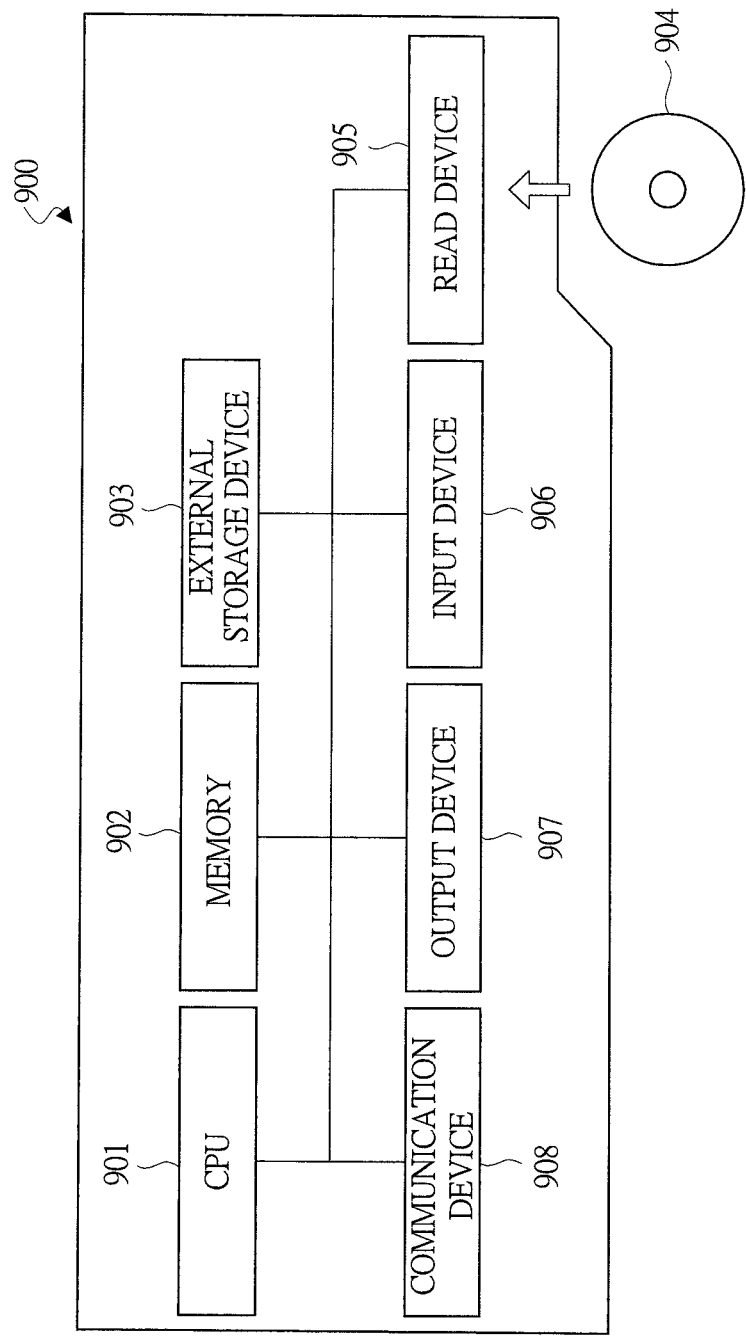
FIG. 14 is a schematic diagram of a computer configuring each device of the dynamic maintenance planning apparatus according to the embodiment of the present invention.

The above-described maintenance planning device 110 and the priority calculating device 130 can be each implemented by, for example, a general computer 900 as depicted in FIG. 14 (which is a schematic diagram of the computer 900) including a central processing unit (CPU) 901, a memory 902, an external storage device 903 such as a hard disk drive (HDD), a read device 905 that reads and writes information from and into a transportable storage medium 904 such as a compact disk (CD) or a digital versatile disk (DVD), an input device 906 such as a keyboard or a mouse, an output device 907 such as a display, and a communication device 908 such as a network interface card (NIC) for connection to a communication network.

For example, the storage unit 111 and the storage unit 131 can be implemented by the CPU 901 using the memory 902 or the external storage device 903. The control unit 121 and the control unit 141 can be implemented by loading a predetermined program stored in the external storage device 903 onto the memory 902 and executing the program at the CPU 901. The input unit 126 and the input unit 146 can be implemented by the CPU 901 using the input device 906. The screen output device 170 can be implemented by the CPU 901 using the output device 907. The communication unit 128 and the communication unit 148 can be implemented by the CPU 901 using the communication device 908.

The predetermined program may be downloaded into the external storage device 903 from the storage medium 904 via the read device 905 or from a network via the communication device 908, and then loaded onto the memory 902 and executed by the CPU 901.

Also, the program may be directly loaded onto the memory 902 from the storage medium 904 via the read device 905 or a network via the communication device 908, and then executed by the CPU 901.

The manufacturing-information providing device 150 extracts, from manufacturing execution system (MES) data obtained from a MES that manages the manufacturing apparatuses on the target manufacturing system, type-specific process route data, apparatus maintenance plan data, lot releasing plan data, lot state data, and manufacturing-apparatus state data, and then transmits these data via the network 190 to the information acquisition managing unit 122 of the maintenance planning device 110 and the information acquisition managing unit 142 of the priority calculating device 130. Here, the manufacturing-information providing device 150 can also be implemented by the general computer 900 as depicted in FIG. 14.

The simulation device 160 creates a simulation model on the computer for the manufacturing system and production process, simulating time transition in that model and, for all lots released into the manufacturing system, creating a lot progress plan with a process route for each type and various dispatch rules for lot assignment. From the created progress plans for all lots, various statistical data can be output, for each product/type, process, step, and manufacturing apparatus.

Although the accuracy of the simulation result is predicted to vary depending on actual information and accuracy to be considered in a simulation model, it is assumed in the present embodiment that an existing production simulator is used without specifying a simulation scheme. However, it is assumed that, upon creating a simulation model, input specifications specific to the present embodiment are provided and the simulation model including data input according to the input specifications can be executed.

Here, in the example depicted in FIG. 1, the simulation device 160 is implemented in an apparatus different from the maintenance planning device 110. Alternatively, the functions of the simulation device 160 can be embedded in the maintenance planning device 110. The simulation device 160 can also be implemented by the general computer 900 as depicted in FIG. 14.

The screen output device 170 is a device that outputs information as depicted in FIG. 10 and FIG. 19, which will be described further below. The screen output device 170 can also be implemented by the general computer 900 as depicted in FIG. 14.

In the example depicted in FIG. 1, the maintenance planning device 110 and the priority calculating device 130 are implemented by separate devices. Alternatively, these devices can be configured as one device.

Furthermore, all devices can be brought into one information processing device, such as a server, for processing.

Next, the process of the dynamic maintenance planning device according to the embodiment of the present invention is described.

Figure 15:
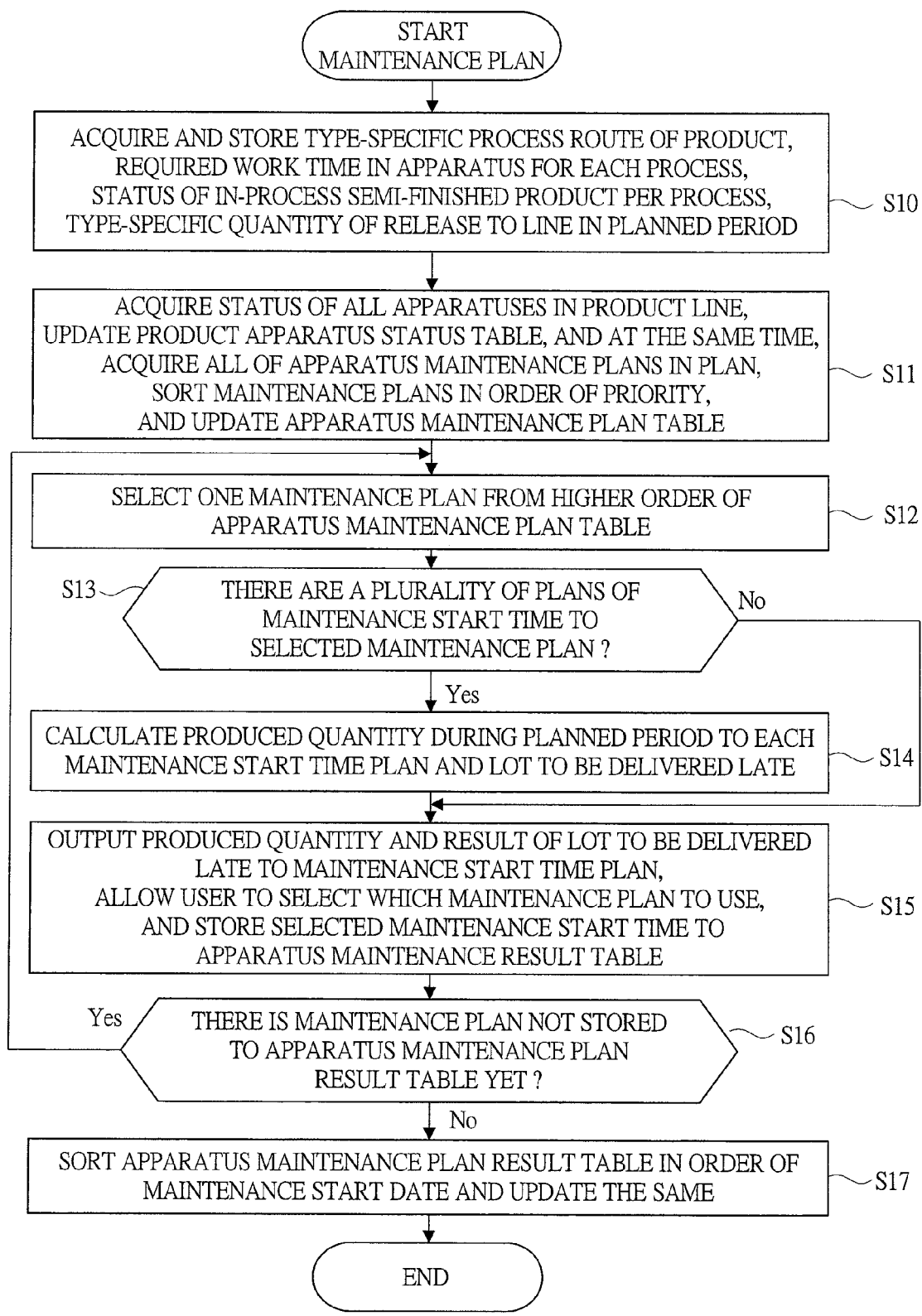
FIG. 15 is a flowchart of a process performed by a maintenance plan generating unit in the maintenance planning device of the dynamic maintenance planning apparatus according to the embodiment of the present invention.

FIG. 15 is a flowchart of the process performed by the maintenance plan generating unit in the maintenance planning device of the dynamic maintenance planning apparatus according to the embodiment of the present invention.

First, the information acquisition managing unit 122 acquires, for each type of product, a process route, an apparatus available for use in each process, and a required operation time in that apparatus from the manufacturing-information providing device 150, and then stores the acquired information in the type-specific process routing table 112a of the storage unit 111. Furthermore, the information acquisition managing unit 122 acquires a lot releasing plan and the states of all lots on the manufacturing system for a specific planned period (for example, one month), and stores the acquired information in the lot releasing plan table 114a of the storage unit 111 and the lot state table 115a of the storage unit 111, respectively (S10).

Next, from the manufacturing-information providing device 150, the information acquisition managing unit 122 acquires the states of all apparatus on the manufacturing system and stores them in the manufacturing-apparatus state table 116a, and acquires all scheduled apparatus maintenance plans and rearranges the acquired maintenance plans in decreasing order of the product of a maintenance period and the number of processes that will stop due to the maintenance operation time of the apparatus for each of the maintenances simultaneously acquired for update of the apparatus maintenance plan table 113a (S11).

Next, the maintenance plan generating unit 123 selects one maintenance plan specified by one record in a sequential order from the top of the apparatus maintenance plan table 113a (S12).

Next, the maintenance plan generating unit 123 determines whether a plurality of proposals are stored in the maintenance start time column 113f of the apparatus maintenance plan table 113a for the selected maintenance plan (S13). When a plurality of maintenance start time proposals are stored (Yes at S13), the procedure goes to S14. When only one maintenance start time proposal is stored (No at S13), the procedure goes to S15.

At S14, the maintenance plan generating unit 123 causes the simulation device 160 to calculate a throughput of a manufacturing system during a planned period when each of a plurality of maintenance start times stored in the maintenance start time column 113f of the apparatus maintenance plan table 113a is used and also to calculate a lot that is completed after the shipping request date (delivery date), the throughput of a manufacturing system being output to a production-quantity display area 200b of an output screen 200 and the lot being output to a delivery-delayed-lot display area 200c thereof.

As input data defining maintenance plans other than the target maintenance plan, the data stored in the maintenance start time column 117d and the maintenance period column 117e of the apparatus maintenance plan result table 117a is input into the simulation device 160. As for maintenance plans whose data is not stored in the apparatus maintenance plan result table 117a, data stored in the maintenance-start-time proposal 1 column 113g and the maintenance period column 113e of the apparatus maintenance plan table 113a is input for simulation.

Next, the maintenance plan generating unit 123 prompts the user to select a maintenance start time via the output screen 200, and then stores the maintenance start time proposal selected by the user in the maintenance start time column 117d of the apparatus maintenance plan result table 117a (S15).

At S15, when only one maintenance start time proposal is stored in the maintenance-start-time proposal column 113f of the apparatus maintenance plan table 113a for the selected maintenance plan, the maintenance plan generating unit 123 only duplicates the record in the maintenance-start-time proposal column 113f into the maintenance start time column 117d of the apparatus maintenance plan result table 117a.

Next, the maintenance plan generating unit 123 checks to see whether a maintenance plan whose maintenance start time is not determined is present, that is, the presence or absence of a maintenance plan whose record is not stored in the maintenance start time column 117d of the apparatus maintenance plan result table 117a (S16). If such a maintenance plan is present (Yes at S16), the procedure returns to S12 to repeat the process. If it is not present (No at S16), the procedure goes to S17.

At S17, the maintenance plan generating unit 123 rearranges the records stored in the apparatus maintenance plan result table 117a in decreasing order of time so that a maintenance plan for which the time stored in the maintenance start time column 117d of the apparatus maintenance plan result table 117a is earliest is stored first, thereby updating the apparatus maintenance plan result table 117a.

The maintenance plan generating unit 123 may cause a maintenance plan whose throughput of a manufacturing system determined as described above is maximum to be displayed on the screen output device 170 in a predetermined display format.

In the flowchart depicted in FIG. 15, in the process at S15, the user is prompted to select a maintenance start time. Alternatively, as depicted in FIG. 16, among the maintenance start time proposals whose throughput of a manufacturing system is maximum, the one that starts latest may be used as maintenance start time.

Figure 16:
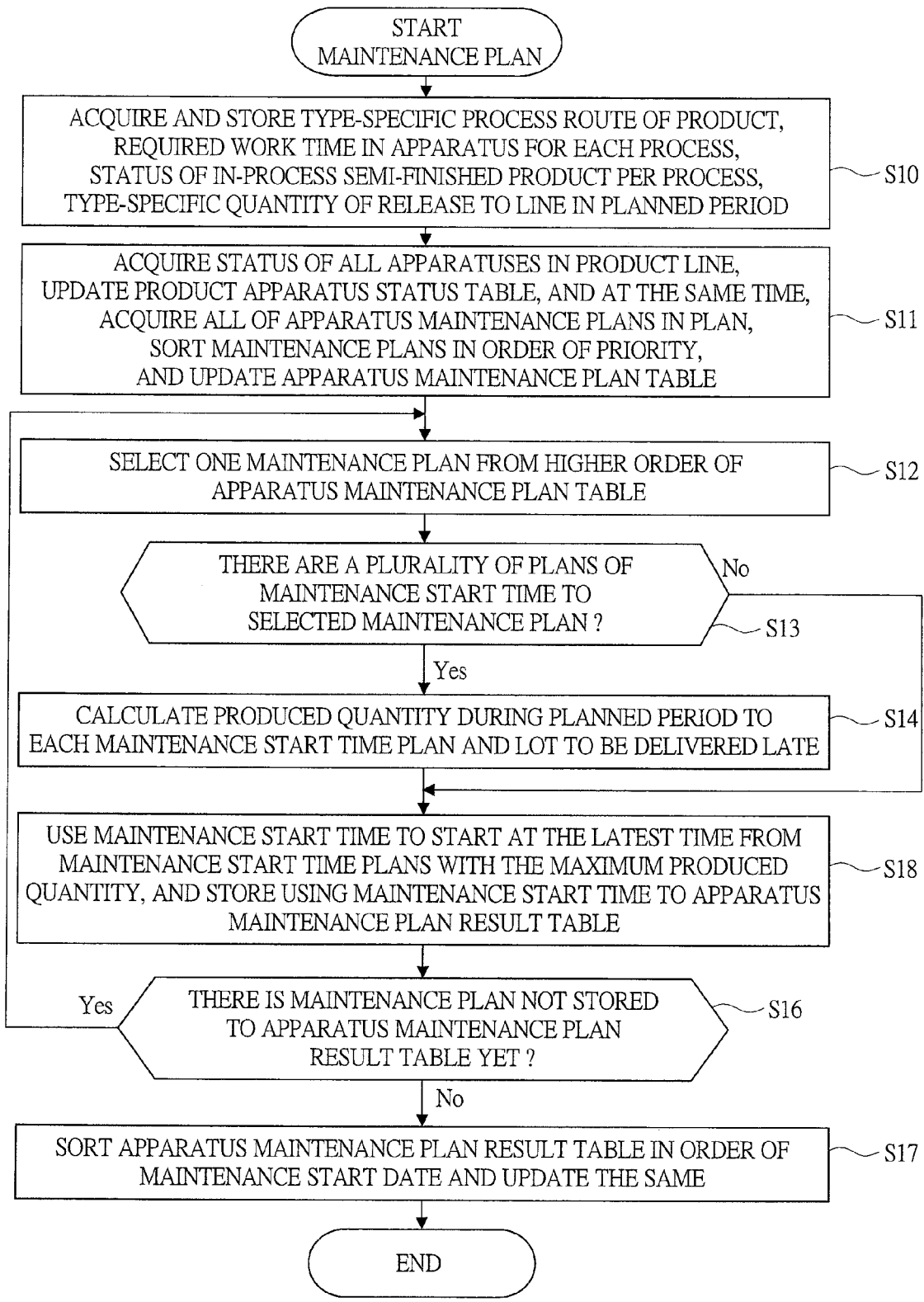
FIG. 16 is a flowchart of another process performed by the maintenance plan generating unit in the maintenance planning device of the dynamic maintenance planning apparatus according to the embodiment of the present invention.

FIG. 16 is a flowchart of another process performed by the maintenance plan generating unit in the maintenance planning device of the dynamic maintenance planning apparatus according to the embodiment of the present invention.

The flowchart of FIG. 16 is different from that of FIG. 15 in that, after the process at S14, in place of the process at S15, among the maintenance start time proposals whose throughput of a manufacturing system is maximum, the one that starts latest is used as a maintenance start time, and the adopted maintenance start time is stored in the maintenance start time column 117d of the apparatus maintenance plan result table 117a (S18) and then the process at S16 is performed. Other processes are similar to those in the flowchart depicted in FIG. 15.

FIG. 10 is a schematic diagram of the output screen 200 as an example of output information generated by the maintenance planning device of the dynamic maintenance planning apparatus according to the embodiment of the present invention.

The output screen 200 has a planned period input area 200a, the production-quantity display area 200b, the delivery-delayed-lot display area 200c, and a maintenance-start-time-proposal selection area 200d.

First, on the output screen 200 displayed on the screen output device 170, an input is received in the planned period input area 200a via the input unit 126 to read the data stored in the apparatus maintenance plan table 113a.

The apparatus whose maintenance is planned is output in the order determined by the maintenance planning device. Also, the throughput of a manufacturing system calculated for each maintenance start time proposal stored in the apparatus maintenance plan table 113a is output to the production-quantity display area 200b, and lots whose delivery will be delayed are output to the delivery-delayed-lot display area 200c.

From the output result of the production-amount display area 200b and the delivery-delayed-lot display area 200c, the user selects a start time displayed on the maintenance-start-time-proposal selection area 200d as a start time for the target maintenance, and enters the decision.

With this output screen 200 displayed on the screen output device 170, the manufacturer operating the manufacturing apparatus can decide, for example, a maintenance date so that the throughput of a manufacturing system is maximum, based on the outputs on the production-amount display area 200b and the delivery-delayed-lot display area 200c.

As depicted in FIG. 16, when a proposed maintenance start time that starts latest is adopted as maintenance start time among the maintenance start time proposals whose throughput of a manufacturing system is maximum, a result of the adoption can be displayed on the output screen 200. Furthermore, the output screen 200 can be configured so that the user can confirm and change the adoption result.

Figure 17:
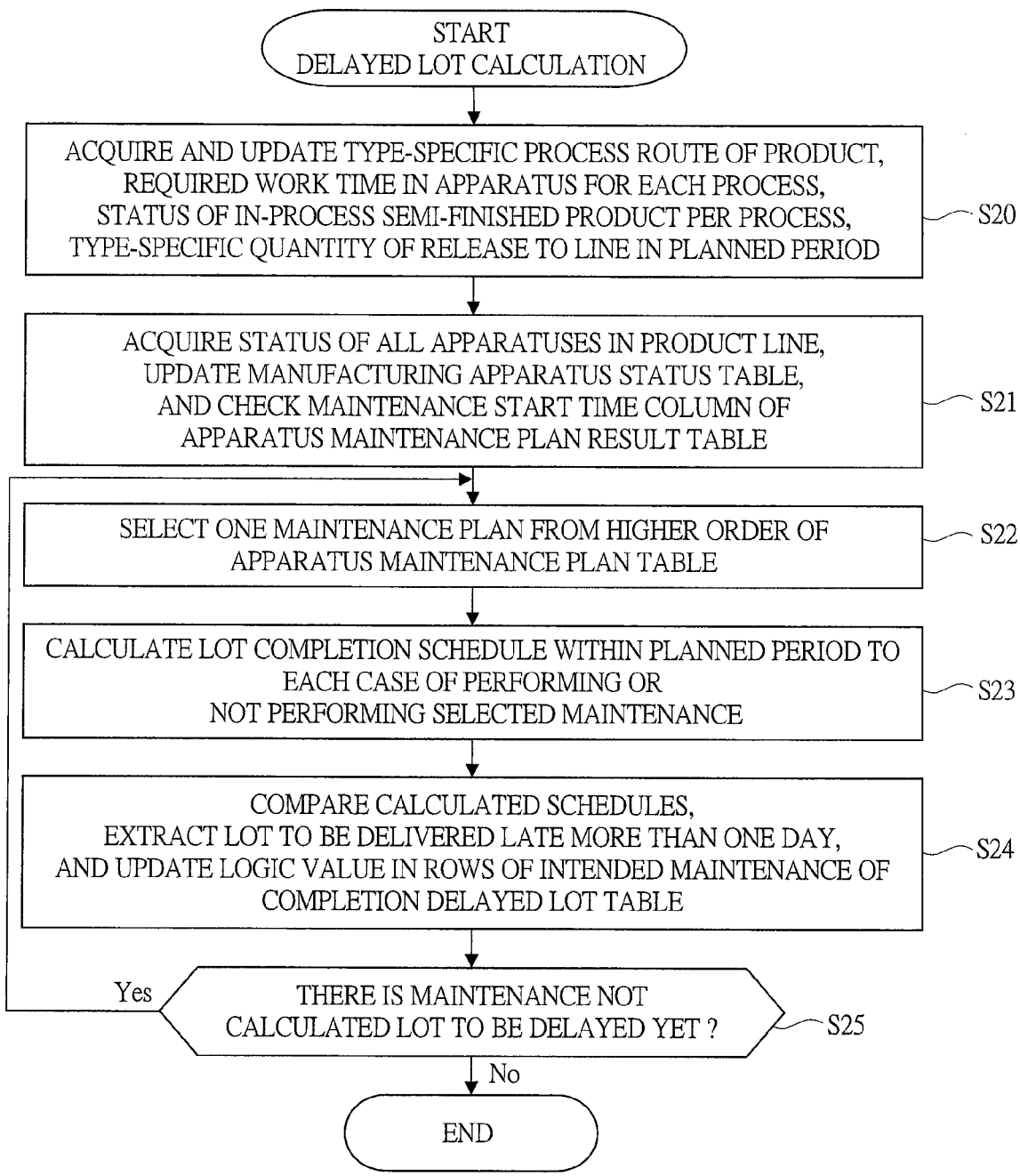
FIG. 17 is a flowchart of a process of a completion-delayed lot calculating unit in the maintenance planning device of the dynamic maintenance planning apparatus according to the embodiment of the present invention.

FIG. 17 is a flowchart of a process of the completion-delayed lot calculating unit in the maintenance planning device of the dynamic maintenance planning apparatus according to the embodiment of the present invention.

First, for each type of product, the information acquisition managing unit 122 acquires, from the manufacturing-information providing device 150, a process route, an apparatus available in each process, and a required operation time at that apparatus, and updates the type-specific process routing table 112a of the storage unit 111. Furthermore, the information acquisition managing unit 122 acquires a lot releasing plan during a specific planned period (for example, one month) and the state of all lots on the manufacturing system, and updates the lot releasing plan table 114a of the storage unit 111 and the lot state table 115a of the storage unit 111 (S20).

Next, the completion-delayed-lot calculating unit 124 acquires the state of all apparatus on the manufacturing system from the manufacturing-information providing device 150, updates the manufacturing-apparatus state table 116a, and further checks whether the records in the maintenance start time column 117d of the apparatus maintenance plan result table 117a are present for all maintenance plans (S21).

If any maintenance whose record is not stored is present, the information acquisition managing unit 122 acquires information about the scheduled maintenance plan from the manufacturing-information providing device 150 or causes the maintenance plan generating unit 123 to execute.

Next, the completion-delayed-lot calculating unit 124 selects one maintenance plan specified by one record in a sequential order from the top of the apparatus maintenance plan result table 117a (S22).

Next, the completion-delayed-lot calculating unit 124 causes the simulation device 160 to creates progress plans for all lots when the selected maintenance plan is performed and those for all lots when the selected maintenance plan is not performed.

Here, in the simulation device 160, the data stored in the maintenance start time column 117d and the maintenance period column 117e of the apparatus maintenance plan result table 117a is input as input data defining maintenance plan other than the target maintenance plan, and a simulation is performed (S23).

Next, the completion-delayed-lot calculating unit 124 compares progress plans obtained at S23 for two lots, specifies a lot whose completion will be delayed one day or more when the target maintenance plan is performed, and stores '1' in a column corresponding to the lot whose completion will be delayed and stores '0' in a column corresponding to a lot whose completion will not be delayed, in the logical value column 118e in the delayed lot table 118a for the target maintenance plan.

Next, the completion-delayed-lot calculating unit 124 checks to see whether a maintenance plan without a lot whose completion will be delayed being specified, that is, the presence or absence of a maintenance plan with no record stored in the logical value column 118e of the delayed lot table 118a (S25). If such a maintenance plan is present (Yes at S25), the procedure returns to S22 to repeat the process. If such a maintenance plan is absent (No at S25), the procedure ends.

FIG. 18 is a flowchart of a process performed by the priority calculating device of the dynamic maintenance planning apparatus according to the embodiment of the present invention.

First, the information acquisition managing unit 142 acquires, for each type of product, a process route, an apparatus available for use in each process, and a required operation time in that apparatus from the manufacturing-information providing device 150 to update the type-specific process routing table 112a of the storage unit 131, and further acquires the state of all lot on the manufacturing system to update the lot state table 115a of the storage unit 131 (S30).

Next, the priority calculating device 130 acquires the state of all apparatus on the manufacturing system from the manufacturing-information providing device 150 to update the manufacturing-apparatus state table 116a (S31).

Next, the priority calculating device 130 stores a duplicate of the delayed lot table 118a in the delayed-lot storage area 134 of the storage unit 131 via the network 190.

By referring to the delayed lot table 118a stored in the delayed-lot storage area 134 of the storage unit 131, a priority index of a lot whose completion delay will not occur with any scheduled maintenance plan is calculated for each lot as a ratio (CR value) between the remaining period until the shipping date and the remaining period until product completion. The ratio is stored in the priority index column 136h of the priority information table 136a. At the same time, the remaining period until product completion used for index calculation is stored in the priority-calculation time column 136e of the priority information table 136a, and the remaining operation time until product completion is stored in the remaining operation time column 136g of the priority information table 136a (S32).

Next, the priority calculating device 130 refers to the delayed lot table 118a stored in the delayed-lot storage area 134 of the storage unit 131. As for a lot whose completion will be delayed due to the maintenance, the priority calculating device 130 stores, as a priority index, a ratio between the remaining time until the start of the first maintenance among maintenances that will cause a delay in completion and the remaining period until the process of which the apparatus that will stop due to the maintenance is in charge in the priority index column 136h of the priority information table 136a for each lot. At the same time, the remaining period until the process of which the apparatus that will stop due to the maintenance is in charge used for index calculation is stored in the priority calculation time column 136e of the priority information table 136a, and the remaining time until the start of the first maintenance that will be delayed is stored in the remaining operation time column 136g of the priority information table 136a, both together with a character string indicating that completion will be delayed due to maintenance (S33).

In calculating a ratio between the remaining time until the start of the first maintenance among maintenances that will cause a delay in completion and the remaining period until completion of the process of which the apparatus that will stop due to the maintenance is in charge, if either one of the remaining time and the remaining period is zero, the delayed lot table 118a is referred to for searching the next maintenance plan where a delay of the lot will occur, and a priority index is calculated with that maintenance plan by using a similar technique. At this time, if the next maintenance plan where completion of the lot will be delayed is not present, a priority index is calculated as a ratio between the remaining period until the shipping date and the remaining period until completion of the product. Then, the priority calculating device 130 refers to the priority index column 136*h* of the priority information table 136*a*, the manufacturing-apparatus state table 116*a*, and the lot state table 115*a* to generate an apparatus-type priority information table 136*a* for all apparatuses on the manufacturing system (S34).

Next, for all apparatuses on the manufacturing system, the items in the apparatus-type priority information table are rearranged in the increasing order of priority for updating (S35).

It is assumed in the apparatus-specific priority information table 137*a* that priorities are represented with serial natural numbers starting from '1', the smaller the number, the higher the priority. At the same time, a delay due to maintenance is predicted by the priority calculating unit 143, which will be described further below, for a lot specified in the lot ID column 137*c*, a character string indicating a delay due to maintenance is also stored.

The process performed by the priority calculating device 130 depicted in FIG. 11 is assumed in the present embodiment to be automatically repeated, for example, once in 300 seconds.

Note that the priority calculating device 130 may cause the apparatus-specific priority information table 137*a* for all apparatuses on the manufacturing system to be displayed on the screen output device 170 in a predetermined display format.

FIG. 19 is a schematic diagram of an output screen as an example of output information generated by the priority calculating device of the dynamic maintenance planning apparatus according to the embodiment of the present invention.

An output screen 300 has a manufacturing-apparatus selection area 300*a*, a maintenance-plan display area 300*b*, and a lot-priority display area 300*c*.

In the output screen 300 displayed on the screen output device 170, when an execution instruction with the name of a manufacturing apparatus displayed in the manufacturing-apparatus selection area 300*a* being selected is input via the input unit 146 depicted in FIG. 11, data stored in the maintenance start time column 117*d* and the maintenance period column 117*e* of the apparatus stored in the apparatus name column 117*c* of the apparatus maintenance plan result table 117*a* corresponding to the apparatus specified with the selected apparatus name is used to display the maintenance period of the apparatus in the maintenance-plan display area 300*b*.

At the same time, data stored in the priority column 137*b* and the lot ID column 137*c* of the apparatus-specific priority information table 137*a* corresponding to the apparatus specified with the selected apparatus name is used to display the priority of the apparatus in the lot-priority display area 300*c*.

It is assumed in the output screen 300 that, before an execution instruction with the name of a manufacturing apparatus displayed in the manufacturing-apparatus selection area 300*a* being selected is input, information corresponding to the manufacturing apparatus in charge of the initial process of the manufacturing process is displayed via the input unit 146 depicted in FIG. 11.

With this output screen 300 displayed on the screen output device 170, the manufacturer operating the manufacturing apparatus can minimize lots whose completion will be delayed due to maintenance by performing maintenance during a period displayed in the maintenance plan display area 300*b* and releasing a lot with the highest priority displayed on the lot-priority display area 300*c* into the manufacturing apparatus.

In the foregoing, the invention made by the inventors of the present invention has been concretely described based on the embodiments. However, it is needless to say that the present invention is not limited to the foregoing embodiments and various modifications and alterations can be made within the scope of the present invention.

The present invention relates to a dynamic maintenance planning apparatus in a system for calculating a priority of a lot to be released in each manufacturing process in order to enhance production efficiency of a production system configured of a plurality of processes, and is widely applicable to, for example, a system having a maintenance-required production line.

What is claimed is:

1. A dynamic maintenance planning apparatus on a manufacturing system where a manufacturing apparatus is shared among a plurality of processes and a plurality of products are manufactured, the dynamic maintenance planning apparatus comprising at least one of a hardware processor and circuitry configured to effect:

a maintenance plan generator configured to determine a maintenance date and time on and at which a throughput of a manufacturing system is maximum from among possible maintenance dates and times, based on a result of a simulation in which the manufacturing apparatus that is specific on the manufacturing system is stopped at a specified maintenance date and time;

a completion-delayed-lot calculator configured to specify a lot whose completion is predicted to be delayed due to maintenance on the determined maintenance date and time; and a priority calculator configured to calculate a priority of the lot whose completion is predicted to be delayed, so as to prevent waiting time of the lot during maintenance;

wherein the completion-delayed-lot calculator is configured to: create a simulation model where the manufacturing apparatus as a target will stop as scheduled, and a simulation model where the manufacturing apparatus as a target will not stop; create two progress plans for all lots based on each of the simulations during a specified period; and specify a lot whose completion will be delayed when maintenance is performed based on a difference between times in a completion process of the progress plans.

2. The dynamic maintenance planning apparatus according to claim 1, wherein the simulation is performed at predetermined intervals or at a timing with an event occurrence as a trigger, and a result is stored in a storage medium.

3. The dynamic maintenance planning apparatus according to claim 1, wherein the maintenance plan generator is configured to: create a plurality of candidates for change for a stop start date and a stop period within an adjustable range of a stop schedule of the manufacturing apparatus; calculate a decrease of the throughput of the manufacturing system for each of the plurality of candidates for change; and determine a maintenance date and time on and at which the throughput of the manufacturing system is maximum.

4. A dynamic maintenance planning apparatus on a manufacturing system where a manufacturing apparatus is shared among a plurality of processes and a plurality of products are manufactured, the dynamic maintenance planning apparatus comprising at least one of a hardware processor and circuitry configured to effect:

a maintenance plan generator configured to determine a maintenance date and time on and at which a throughput of a manufacturing system is maximum from among possible maintenance dates and times, based on a result of a simulation in which the manufacturing apparatus that is specific on the manufacturing system is stopped at a specified maintenance date and time;

a completion-delayed-lot calculator configured to specify a lot whose completion is predicted to be delayed due to maintenance on the determined maintenance date and time; and a priority calculator configured to calculate a priority of the lot whose completion is predicted to be delayed, so as to prevent waiting time of the lot during maintenance;

wherein for lots whose completion will be delayed due to a stop of the manufacturing apparatus, the priority calculator is configured to calculate a priority for each of the lots so that a lot having a smaller ratio between a remaining time until the stop of the manufacturing apparatus causing a delay of completion and a remaining period until completion of a process of which the manufacturing apparatus that will stop is in charge, is given a higher priority for being released in each manufacturing process.

5. The dynamic maintenance planning apparatus according to claim 4, wherein, for lots whose completion will not be delayed due to a stop of the manufacturing apparatus, the priority calculator is configured to calculate a priority for each of the lots so that a lot having a smaller ratio between a remaining period until a shipping date and a remaining period until product completion, is given a higher priority for being released in each manufacturing process.

\* \* \* \* \*